Feb. 10, 1925.         P. M. FARMER         1,525,984
CLUTCH CONTROLLER
Filed June 24, 1922
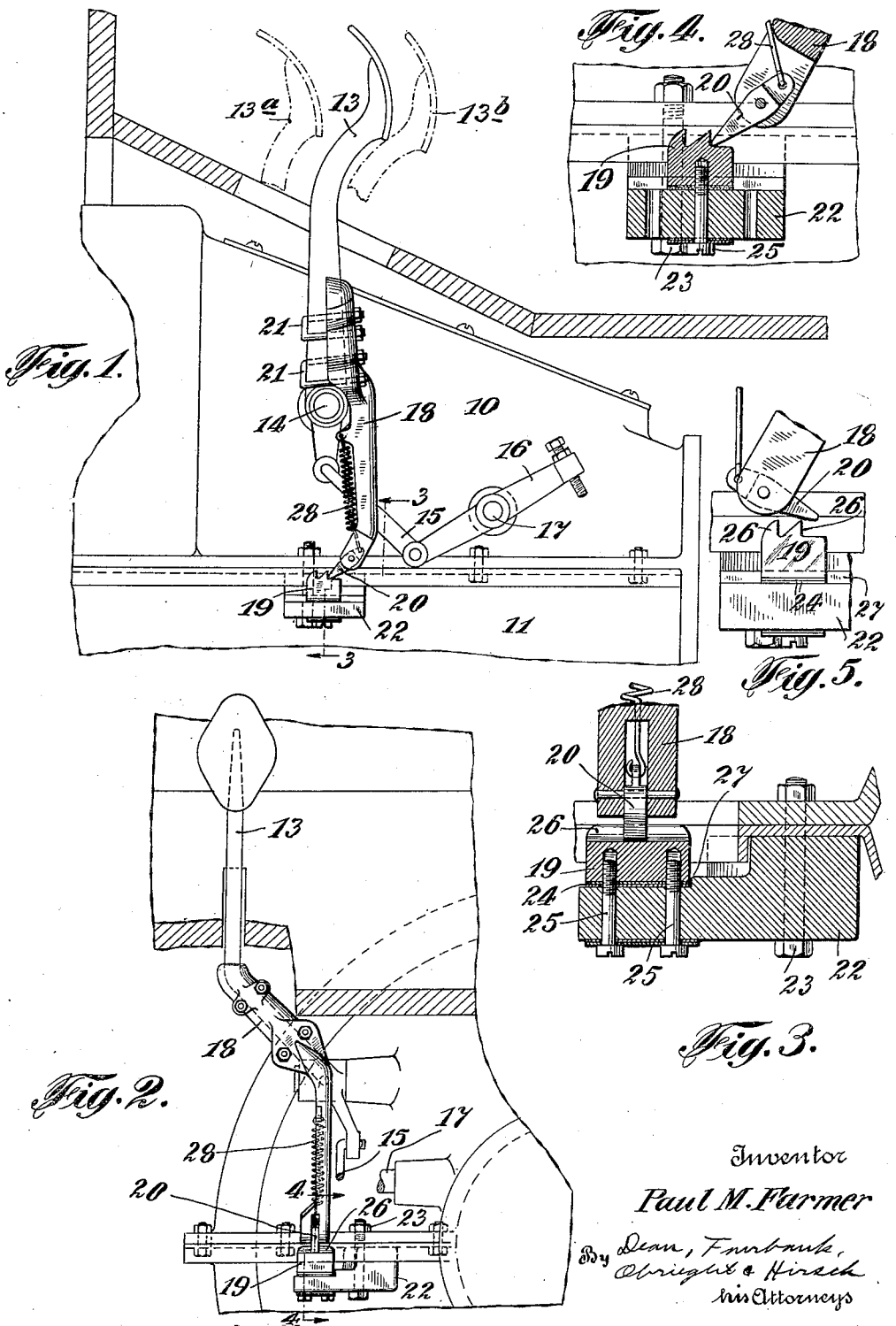
Inventor
Paul M. Farmer
By Dean, Fairbank,
Obright & Hirsch
his Attorneys Patented Feb. 10, 1925.

1,525,984

UNITED STATES PATENT OFFICE.

PAUL M. FARMER, OF EAST ORANGE, NEW JERSEY.

CLUTCH CONTROLLER.

Application filed June 24, 1922. Serial No. 570,669.

*To all whom it may concern:*

Be it known that I, PAUL M. FARMER, a citizen of the United States, and resident of East Orange, in the county of Essex and State of New Jersey, have invented certain new and useful Improvements in Clutch Controllers, of which the following is a specification.

This invention is an improved stop mechanism which under predetermined conditions acts to automatically lock a movable member against movement in one direction in a limited part of its range of back and forth movement.

Although my improved mechanism is capable of use in a wide variety of machines and apparatus, an important use is in combination with the clutch pedal of a Ford car, and such combination also forms an important part of my present invention.

One object of my invention is to provide simple and inexpensive means which may be easily attached to the clutch pedal of a Ford car and to an adjacent frame or body part whereby the clutch may be held in neutral position without application of the emergency brake, and permitting the driver to take his foot off the clutch pedal and let the car coast or remain stationary while the engine is running.

A further object is to provide mechanism for this purpose which will work automatically without special attention on the part of the driver, without requiring the independent movement of other parts to lock or release, and which is always ready for instant use without interfering with the normal operation of the standard parts.

By means of my invention the free movement of the clutch pedal forward into low, or back into high gear, is not in any way interfered with, but the driver may take his foot off the pedal when it is in neutral, and the pedal and clutch will remain in that position. When it is desired to go into low, as for instance after the car has been stopped in traffic, the clutch pedal may be pushed directly forward in the usual way, and if it is desired to go into high directly from neutral, as for instance after coasting, the pedal may be pushed forward to only a very slight extent, which will release it and permit it to come back into high.

The mechanism itself may assume various forms within the scope of my invention, and the form illustrated, or appropriate modifications thereof, may be used in connection with a wide variety of oscillating or reciprocating members which it may be desired at times to hold in an intermediate position, and against gravity or spring action.

In the accompanying drawings I have illustrated only one embodiment of my invention, and have illustrated that in connection with certain parts of a Ford. In these drawings:

Fig. 1 is a side elevation.

Fig. 2 is a rear elevation.

Fig. 3 is a transverse section on the line 3—3 of Fig. 1.

Fig 4 is a transverse section on the line 4—4 of Fig. 2, and

Fig. 5 is a view similar to a portion of Fig. 4, but showing the parts in another position.

The parts of a standard Ford car which are illustrated include upper and lower sections 10 and 11 of the transmission casing or cover, the clutch pedal 13 mounted on a stud 14 and connected by a link 15 to the clutch lever 16 on the clutch lever shaft 17. With the parts in the position shown in solid lines the clutch is disengaged. By moving the clutch pedal forward to the dotted position 13ª the clutch is engaged with the transmission in low gear, while with the clutch pedal in the other or rearward dotted position 13ᵇ, the clutch is also engaged but the transmission is in high gear.

In the standard Ford construction the clutch pedal and clutch cannot be held in the neutral or intermediate position except by holding the foot on the clutch pedal or by applying the emergency brake. This precludes coasting except by holding the foot on the clutch pedal, and prevents the driver from taking his foot off the pedal when the car is at rest and the engine is running, unless he first pulls the emergency brake lever. My invention provides simple means for holding the clutch pedal in intermeiate position, and the clutch in neutral at any time desired without regard to the position of the emergency brake, and without holding the foot on the clutch pedal. The specific mechanism shown includes a part 18 which is clamped or otherwise rigidly secured to the clutch pedal, and a part 19 which is rigidly attached to a stationary part of the frame or body. One of these parts is provided with a dog or pawl 20 for locking cooperation with the other part.

In the specific form illustrated the part 18 is in the form of an arm extending in the general direction of the clutch pedal and downwardly to a point at substantially the elevation of the lower edge of the upper section 10 of the transmission casing. This arm may be rigidly secured to the clutch pedal in any suitable manner, as for instance by a pair of U bolts 21. The arm may be cast or so formed that it can be locked to the clutch pedal in only a single predetermined position.

The member 19 is illustrated as being adjustably secured to a block or plate 22 which may be rigidly secured to the transmission casing, as for instance by a bolt 23 inserted in place of one of the regular bolts which hold the upper and lower sections together. The position of the member 19 may be adjusted vertically by means of shims 24. All of these may be held beneath the member 22 by the heads of the screw bolts 25 which connect the members 19 and 22, if it is desired to have the member 19 in the lowermost position, while any desired number of these shims may be transferred to a position between the members 19 and 22 to raise the latter to the desired elevation. The position of the member 19 may also be adjusted in the general direction of movement of the lower end of the arm 18. This may be accomplished by providing the member 22 with a plurality of rows of bolt holes, as shown particularly in Fig. 4, whereby the screw bolts may be inserted through different holes to hold the member 19 in different positions. One exposed surface of the member 19 is provided with a stop 26 presenting a shoulder facing in one direction of the movement of the member 18, and adapted to cooperate with the pawl or dog 20. If desired there may be a plurality of these stops, each with its shoulder constructed substantially in the form of a series of teeth on the member 19.

Preferably the member 22 is provided with a shoulder 27 against which one side of the member 19 engages, and the distance between this shoulder and one of the screw bolts is less than the distance between the opposite vertical side of the member 19 and the threaded hole in said member adjacent to said side. Therefore the member 19 cannot be secured to the member 22 except with the stop or stops 26 facing in a predetermined direction.

The pawl 20 which is pivoted to the member 18 may be so designed and mounted that the action of gravity causes it to engage with the member 19, or it may be provided with a spring to render the action more certain. As shown, the pawl 20 normally depends from the lower end of the member 18, and is held in this position by a coil spring 28 connected to the pawl above its pivot point, and to an upper portion of the member 18. This spring permits the pawl to swing in either direction from its normal depending position. The length of the pawl is such that when the stop member 19 is properly positioned in respect to the arm 18, the pawl will engage with the upper surface of the stop member and be deflected or swung first in one direction and then in the other during the back and forth movement of the member 18 and the clutch pedal to which it is connected. During such normal movement of the clutch pedal and the arm 18, the pivoted end of the pawl will travel in advance of the lower or free end, and this free end will in effect be dragged across the stop member without interfering with the free movement of the clutch pedal. The clutch or clutch pedal is provided with spring mechanism which normally tends to hold the parts in high gear with the clutch pedal in the position indicated in dotted lines as 13$^b$. The pawl and stop member do not under any circumstances prevent the free movement of the clutch from high to neutral, or neutral to low, or in any way interfere with the movement of the clutch pedal from the position indicated at 13$^b$ to the position indicated at 13$^a$. They do cooperate to prevent the return movement of the clutch pedal from neutral to 13$^b$ if the clutch pedal is stopped in neutral after having been moved from 13$^b$ or toward 13$^a$. The parts are shown in Fig. 1 in the position which they may assume during a movement from 13$^b$ toward 13$^a$. It will be noted that the pawl 20 has its free end extending forwardly, and has just been dragged or drawn across a portion of the upper surface of the stop member 19. If the driver remove his foot from the clutch pedal with the parts in this position, the return movement of the clutch pedal to the position indicated at 13$^b$ will be prevented by the engagement of the free end of the pawl with the shoulder of one of the stops. The parts will be held independently in this position until the driver applies a slight pressure to the clutch pedal and moves the latter toward the 13$^a$ position to a sufficient extent to permit the free end of the pawl 20 to pass beyond the member 19. The spring 28 then instantly pulls the pawl to a substantially vertical position, and then if the clutch pedal be permitted to return toward the 13$^b$ position the pawl will be dragged across the stop member with the free end to the rear, rather than being pushed across it with the free end of the pawl in advance. During such movement the parts would pass through the position indicated in Fig. 5.

From the foregoing it will be seen that the driver may freely pass from high to neutral, or from neutral to low, or from low to neutral or neutral to high without the pawl and stop operating in any way to interfere with such normal movement of the clutch pedal. Thus the driver might have the device attached and never even know that it was there, so far as the free use of the standard parts in the ordinary way is concerned. The parts cooperate to perform their desired function only when the clutch pedal is brought to rest in a predetermined position in neutral after a movement toward low. Under those circumstances the parts cooperate to prevent the return movement under the action of the main clutch spring, but the pawl is instantly disengaged by comparatively small movement of the clutch pedal toward low.

If the part which is desired to hold in neutral position be one normally held at one end of its range of back and forth movement by gravity or spring action, the stop member may present shoulders facing in only one direction, as in the form above described, but under some circumstances it may be desired to prevent the member from being stopped in an intermediate position and return without having first completed its movement, and irrespective of the direction in which the member was moving at the time it was stopped. In such cases the stop member might present shoulders facing in opposite directions. If there is only a single position in which it is desired to hold the member, then the stop member may have only a single shoulder or tooth, but if there is an intermediate range in any part of which it is desired to hold the member, then the stop member may present the desired number of shoulders or teeth, and spaced at the desired distance apart.

I do not wish to be limited to the use of a pivoted pawl and shoulder stop member, as I have designed other forms of cooperating parts which will accomplish the same results.

Having thus described my invention, what I claim as new and desire to secure by Letters Patent is:—

1. The combination with an auto clutch pedal movable in one direction from neutral to high gear position, and in the opposite direction from neutral to low gear position, a stationary member presenting a shoulder, a pivoted pawl carried by said clutch pedal and normally extending in a direction substantially at right angles to the direction of movement of the pivot of the pawl, and adapted to swing in either direction from said normal position whereby the free end of the pawl may move across said stationary member in either direction when the pivot of the pawl is in advance of said free end and said shoulder being adapted to engage with said free end and lock the pedal against movement into high gear position when said pedal is stopped in neutral directly after movement from high gear position.

2. In combination, a stop member presenting a shoulder and having means for securing the same to the transmission casing of a Ford car, an arm adapted to be secured to the clutch pedal of the car, said arm having a pawl pivoted thereto and yielding means for normally holding it in a predetermined position but permitting movement in either direction from said position and permitting the operating end to be drawn across said stop member during the swinging of said arm in either direction.

3. In combination, a stop member presenting a shoulder and having means for securing the same to the transmission casing of a Ford car, and an arm adapted to be secured to the clutch pedal of the car, said arm having a pawl pivoted thereto and normally held in a predetermined position but movable in either direction from said position as it is drawn across said stop member during the swinging of said arm, said shoulder being adapted to engage with said stop member to prevent the pushing of the pawl across its surface with the operating end in advance of the pivot of the pawl.

4. In combination, a stop member adapted to be secured to the transmission casing of a Ford, an arm adapted to be secured to the clutch pedal, a pawl pivoted to said arm and adapted to engage with said stop member, and means for vertically adjusting said stop member.

5. In combination, a stop member adapted to be secured to the transmission casing of a Ford, an arm adapted to be secured to the clutch pedal, a pawl pivoted to said arm and adapted to engage with said stop member, and means for adjusting said stop member in a back and forth direction.

6. In combination, a bracket member adapted to be secured to the transmission casing of a Ford car, a stop member adjustably secured thereto, and presenting a rearwardly facing shoulder, a member adapted to be secured to the clutch pedal, and a spring pressed pawl pivoted to said member and adapted to engage with said shoulder to prevent return movement of the clutch into high from neutral when stopped in neutral after a movement toward low.

Signed at New York in the county of New York and State of New York this 23rd day of June, A. D. 1922.

PAUL M. FARMER.